(12) United States Patent
Zeller et al.

(10) Patent No.: US 6,399,131 B2
(45) Date of Patent: Jun. 4, 2002

(54) SOLUBLE COFFEE HAVING INTENSIFIED FLAVOR AND COLOR AND METHOD OF MAKING SAME FROM A COFFEE EXTRACT

(75) Inventors: Bary Lyn Zeller, Glenview, IL (US); Joanne Marie Langdon, Pelham; Gregory Aaron Wiseman, New York, both of NY (US); Evan Joel Turek, Libertyville, IL (US)

(73) Assignee: Kraft Foods Holdings, Inc., Northfield, IL (US)

( * ) Notice: Subject to any disclaimer, the term of this patent is extended or adjusted under 35 U.S.C. 154(b) by 0 days.

(21) Appl. No.: 09/800,974

(22) Filed: Mar. 8, 2001

Related U.S. Application Data

(63) Continuation-in-part of application No. 09/391,846, filed on Sep. 8, 1999, now abandoned.

(51) Int. Cl.[7] .................................................. A23F 5/00
(52) U.S. Cl. ........................................ 426/520; 426/594
(58) Field of Search ................................. 426/594, 520

(56) References Cited

U.S. PATENT DOCUMENTS

| | | | |
|---|---|---|---|
| 3,726,209 A | 4/1973 | Stoltze et al. | 99/289 |
| 3,862,347 A | 1/1975 | Thijssen | 426/434 |
| 4,907,719 A | 3/1990 | Spotholz et al. | 222/1 |
| 5,043,178 A | 8/1991 | Gottesman et al. | 426/432 |
| 5,972,409 A | 10/1999 | Liu et al. | 426/595 |
| 5,997,929 A | 12/1999 | Heeb et al. | 426/433 |

FOREIGN PATENT DOCUMENTS

| | | |
|---|---|---|
| WO | WO9410852 | 5/1994 |

*Primary Examiner*—Anthony J. Weier
(74) *Attorney, Agent, or Firm*—Larson & Taylor, PLC

(57) ABSTRACT

A method of intensifying the flavor of coffee extract is set forth in which coffee extract is heated at a temperature and for a time sufficient to intensify the flavor of the coffee. The heated coffee extract is cooled and preferably dried to produce a soluble coffee product having intensified flavor. The flavor intensity of soluble coffee can be increased without deleteriously altering coffee flavor.

12 Claims, No Drawings

SOLUBLE COFFEE HAVING INTENSIFIED FLAVOR AND COLOR AND METHOD OF MAKING SAME FROM A COFFEE EXTRACT

This application is a continuation-in-part of prior application Ser. No. 09/391,846 filed Sep. 8, 1999 now abandoned.

FIELD OF THE INVENTION

The present invention relates to a soluble coffee product having intensified flavor and color and to methods of heat treating a coffee extract to intensify the flavor and color for use in soluble coffee products without deleteriously altering the flavor of the coffee.

BACKGROUND OF THE INVENTION

Soluble coffee products, often referred to as "instant coffee", are prepared from aqueous extracts of roasted and ground coffee. The products are generally in the form of spray-dried or freeze-dried particulate solids.

The process of making soluble coffee causes loss of coffee aroma and flavor relative to the roasted and ground coffee from which the soluble coffee was prepared. Various methods have been developed to increase the aroma and yield of soluble coffee. For example, coffee aroma recovered during coffee grinding is often added to soluble coffee products. It is also known that the yield of conventional soluble coffee (e.g., spray-dried powder having a moisture content of about 2–3% by weight) can be increased by heating instant coffee at a temperature sufficiently high to melt the coffee and to cause pyrolysis of carbohydrates resulting in generation of carbon dioxide. This method is described in International Patent Application No. PCT/US93/10405 published May 26, 1994 as No. WO 94/10852 (hereinafter WO '852). Generation of carbon dioxide in the melt causes the melt to foam. The foam is then solidified by cooling and comminuted to form a foamed particulate soluble coffee product.

The heating process causes significant weight loss, on the order of about 7–10% by weight in addition to loss of water. It is reported in WO '852 that the weight of the foamed product needed to prepare a serving of coffee beverage is reduced by 30–50% relative to the amount of conventional soluble coffee products, such as spray dried coffee powder, required to prepare a serving of the same size. However, quality of the beverage is not reported.

The method of WO-852 potentially has several drawbacks. It involves a significant number of new unit operations which must be added to an instant coffee manufacturing process. These would include coffee powder handling, coffee powder heating such as by extrusion, coffee melt handling, melt cooling, solidified melt grinding and coffee powder sizing. Potentially, heating of dried coffee extract powder could produce flavor consistency problems especially if the coffee melt in the extruder is not completely and continuously wiped from the walls and screws producing burning of some of the coffee.

SUMMARY OF THE INVENTION

The invention is directed to a method of providing a soluble coffee having intensified flavor and color in which a coffee extract is heated at a temperature and for a time selected to optimize the flavor and color of the coffee extract. The extract is then cooled and may be dried to form a soluble coffee powder which may be sold as is as an instant coffee, combined with traditional soluble coffee, incorporated into a liquid coffee product or combined with sugar, creamer, flavors, etc. to form a soluble coffee product. Alternatively, the intensified extract may be directly incorporated into a ready to drink or concentrated liquid coffee product without undergoing a drying step.

The present invention may easily be incorporated into a standard instant coffee manufacturing process. Coffee extract which has exited the percolators is collected and/or first concentrated or evaporated and then preferably treated in a single piece of equipment, typically a plug flow reactor, which will heat the extract under pressure to effect flavor and color intensification and subsequently cool the intensified extract.

DESCRIPTION OF PREFERRED EMBODIMENTS

The coffee extract utilized as the starting material in the present invention is substantially free of roast and ground coffee particles and may be derived from any bean type such as Robusta or Arabica, decaffeinated or caffeine-containing and should contain within the range of 5–70% soluble coffee solids, preferably 30–60%. The extract may be prepared by conventional percolation methods. Such conventional methods are, for example, described in U.S. Pat. No. 2,915,403 which is herein incorporated by reference. Typically, a countercurrent extraction method is utilized wherein water is passed through a packed bed of unextracted roast and ground coffee at a temperature of from about 80° C. to 120° C. in a percolation train of two to six percolators. The extract is recovered from the least spent percolation column and any roast and ground coffee fines are removed by centrifugation. The separation produces a coffee extract which is substantially free of roast and ground coffee particles. The extract yield is typically over 50%.

In general, heating the coffee extract to a temperature below about 100° C. is insufficient to significantly intensify coffee flavor and color, while heating the coffee extract to a temperature above about 170° C. will cause sedimentation in the coffee extract, which results in a loss of color yield and flavor quality. The time sufficient to significantly increase flavor and/or color intensity is dependent on the coffee extract temperature, with longer time being required at lower temperature and less time required at high temperature. The temperatures necessary to intensify the flavor and color of the coffee extract will typically range from 110° C. to 170° C. for a treatment time ranging from about 15 seconds to about 30 minutes. In order to achieve the required temperature, the coffee extract must be heated under elevated pressure of 6 to 100 psig. The extract is heated without increasing the coffee solids content of the extract. Preferably, the coffee solids content remains constant.

The extent of flavor intensity increase is calculated by dividing the additional amount of coffee which would be required to prepare a coffee beverage of a desired flavor intensity using the same instant coffee that was employed to make the heat treated product by the amount of coffee required to prepare a coffee beverage of the same flavor intensity and color using the instant coffee after heat treatment in accordance with the present invention. For example, if dissolving 1.955 grams of untreated instant coffee has the same flavor and color intensity as 1.700 grams of treated coffee, the extent of flavor intensity has been increased by (1.955−1.700)/1.700=15%. The extent of flavor intensity is preferably increased by at least 5% and more preferably by at least 10% and most preferably 15%.

In accordance with a preferred embodiment of the invention, concentrated coffee extract, i.e., at about 30–60% coffee solids, is heated at a temperature and for a time sufficient to intensify the flavor of the coffee extract. The use of a more concentrated extract as the starting material has economic benefit. The extract is then dried, typically by spray-drying or freeze-drying to form a soluble coffee. Particle size may be adjusted by conventional agglomeration techniques. Particle size is preferably the same as that of conventional soluble coffee, generally not more than 5000 μm. Average particle size is preferably within the range of 250–3000 μm.

In general, heating the coffee extract should not exceed a temperature of 170° C. as this tends to result in the formation of sediment. If undesirable sedimentation occurs, the extract and resultant soluble coffee loses both flavor and color and results in negative consumer preference. Heating of the coffee extract may be effected in any manner which allows the extract to be heated up to a temperature of less than 170° C., typically from 110° C. to 170° C. It is preferred to carry out the heating step continuously and not exceed 160° C. In a preferred method, the coffee extract is heated using a plug flow reactor. A plug flow reactor is preferred over a batch reactor as the plug flow reactor allows the coffee extract to be heated and cooled fairly rapidly. The time needed to achieve the desired flavor and color intensity varies with temperature such that residence time in the reactor decreases with increasing temperature.

The intensification of flavor and color is preferably achieved at reaction temperatures of 130–160° C. for a residence time of 2 to 6 minutes, preferably 3–5 minutes. Moreover, intensification occurs without an increase in soluble solids in the extract, and preferably while maintaining a constant content of soluble solids in the coffee extract. (All temperatures herein refer to the temperature of the coffee extract and residence time refers to the time in the reactor at the maximum desired temperature.) In a plug flow reactor, target processing temperature to achieve intensification is generally reached within 5 minutes, assuming the coffee extract enters the plug flow reactor at a temperature of about 5 to 10° C. In the experiments conducted, described in Example 1, the highest level of intensification without deleterious impact on product quality was achieved by heating the coffee extract at 155° C. for 5.4 minutes which achieved a flavor intensity increase of greater than 20%.

After heating, the coffee extract is cooled to a suitable temperature for drying, typically about 60° to 80° C. The extract is then dried by any conventional means to produce soluble coffee.

The resultant soluble coffee is useful by itself as an instant coffee and may also be used in combination with other ingredients, in the same manner as conventional instant coffee, in formulating other soluble coffee-containing food products. It is preferred to use the soluble coffee to prepare dry mix, sweetened, instant coffee products which contain instant coffee, particulate sweetener, and optional ingredients such as flavors, whiteners, and the like.

The amount of soluble coffee, prepared in accordance with the method of the invention, in such sweetened compositions is generally about 2–30% by weight and preferably about 5–20% by weight, based on the weight of the composition.

Suitable sweeteners for the sweetened products include natural and artificial sweeteners. Suitable natural sweeteners include sugars such as sucrose, dextrose, maltose, fructose, lactose, and the like, or a combination thereof in an amount of about 20–80% by weight, preferably about 35–65% by weight, based on the weight of the sweetened coffee product.

Artificial sweeteners, such as saccharin, aspartame, acesulfame-K and the like, or mixtures thereof are used in an amount equivalent to 20–80% by weight sucrose. Artificial sweeteners are normally combined with a bulking agent such as maltodextrin, employed in an amount such that the volume of the combined bulking agent and artificial sweetener is approximately the same as the volume of sucrose which provides the same sweetness.

The sweetened product preferably contains a whitener component. Suitable particulate dry mix whiteners include both non-dairy and dairy creamers. The whitener component of the sweetened composition is suitably about 20 to 60% by weight, and preferably about 25 to 50% by weight, based on the weight of the sweetened product.

The sweetened coffee product may be of the instant cappuccino type which foams when reconstituted in hot water. Foaming can be caused by employing a low density (i.e., gas-injected) particulate whitener or by including a chemical carbonation system, or both. Chemical carbonation may be effected by employing a food grade acid such as citric acid or gluconodeltalactone with a carbonate such as potassium or sodium bicarbonate.

A wide variety of flavors, such as vanilla, hazelnut, mocha, and the like, may be employed in the sweetened coffee product. Various other ingredients may be employed such as foam stabilizing agents, coloring agents, thickeners, etc.

EXAMPLE 1

Experiments were conducted using concentrated aqueous decaffeinated coffee extract at a concentration of about 55% and a temperature of 5 to 10° C. The extract was substantially free of roast and ground coffee particles and prepared using a conventional percolation method as described above. A plug flow reactor comprised of four shell sections in the following configuration:

| Shell # | Action |
| --- | --- |
| 1 | Preheating |
| 2 | Heating |
| 3 | Holding |
| 4 | Cooling or Holding | was used for heating and cooling of the samples. Each shell section had a product volume of 14.6 liters. Target temperature was achieved within 2–6 minutes for all experimental conditions. Two different methods of cooling the product were utilized. The product was either cooled in the 4th shell using cooling water on the jacket or the product was flashed to atmospheric pressure to cool to approximately 100° C. The goal of flash cooling the product was to achieve additional residence time at elevated temperature. Since the back pressure valve was situated between the 3rd and 4th shell of the reactor, the temperature of the product in the 4th shell was limited to 100° C. when flash cooling was utilized. Experiments were conducted at 130, 145, 150, 155, 160, and 180° C.

Samples from each experiment were placed in a sealed plastic pail and held up to 3 hours before spray-drying. The concentrations of the extracts after treatment were still 55% or lower. The samples were not mixed to suspend the solids which settled out prior to spray-drying. The amount of sediment on the bottom of the pail was qualitatively observed to increase with increasing intensity (time and temperature) of experimental conditions. This loss of solids due to sedimentation resulted in a decrease in yield and flavor impact of the dried instant coffee. All samples were spray-dried on an APV Anhydro compact spray dryer using a spinning nozzle. The capacity was rated at 10–20 lb./hour of dry product. Air inlet temperature at the spray dryer was 240° C.

After observing overnight sedimentation in the samples from the first day of experimentation, samples from day 2 and day 3 were collected into test tubes and analyzed after sedimentation. A batch of unprocessed extract was spray-dried each day for use as a control for evaluation of that day's experiments. Runs 1–5 were conducted on Day 1 and were compared with the Day 1 control; Runs 6–10 were conducted on Day 2 and were compared with the Date 2 control; and Runs 11–15 were conducted on Day 3 and were compared with the Day 3 control. The data is shown in Table 1.

TABLE 1

| Run # | Ranking of Intensity of Process Conditions (1 = low 15 = most severe) | Reaction Temp. (C.) | Residence Time at Reaction Temp. (minutes) | Cooling Method | Extract pH |
|---|---|---|---|---|---|
| Day 1 Control | | NA | NA | NA | 4.92 |
| 1 | 1 | 130 | 2.9 | 4th shell | 5.00 |
| 2 | 8 | 160 | 3.0 | 4th shell | 4.94 |
| 3 | 15 | 180 | 3.3 | 4th shell | 4.70 |
| 4 | 12 | 180 | 1.5 | 4th shell | 4.71 |
| 5 | 14 | 180 | 2.4 | 4th shell | 4.81 |
| Day 2 Control | | NA | NA | NA | 5.05 |
| 6 | 3 | 130 | 4.8 | 4th shell | 5.01 |
| 7 | 4 | 145 | 5.0 | 4th shell | 4.91 |
| 8 | 10 | 160 | 5.5 | 4th shell | 4.78 |
| 9 | 2 | 130 | 4.3 | flash | 5.12 |
| 10 | 5 | 145 | 5.2 | flash | 4.99 |
| Day 3 Control | | NA | NA | NA | 5.12 |
| 11 | 9 | 160 | 5.2 | flash | 4.98 |
| 12 | 13 | 180 | 1.9 | flash | 4.81 |
| 13 | 6 | 150 | 5.0 | 4th shell | 4.92 |
| 14 | 7 | 155 | 5.4 | 4th shell | 4.93 |
| 15 | 11 | 170 | 0.25 | 4th shell | 4.94 |

Flavor of the coffee products of the Example was evaluated on a blind basis by between 3 to 5 members of an external panel trained in sensory analysis. Black samples were tasted at 1% solids. Control sweetened, flavored coffee products with creamer (SFC) was tasted using the following recipe: 1.0 g coffee and 13.2 g base (containing sugar, creamer and flavor) in 210 ml water. The variant (20% reduced coffee) was tasted at the following recipe: 0.8 g coffee and 13.4 g base in 210 ml water. Results are reported in Table 2.

TABLE 2

| Ranking of Intensity of Process conditions (1 = lowest 15 = most severe) | Run # | Reaction Temp. (C.) | Residence Time at Reaction Temp. (minutes) | General Observations | Taste Observations (black - all at 1% solids) | Taste Observations (SFV - all variants at 20% reduction in coffee) |
|---|---|---|---|---|---|---|
| | Day 1 Control | | | no sediment in the overnight settled sample | weak body, bland, low cereal and low caramel | Good flavor balance |
| | Day 2 Control | | | no sediment in the overnight settled sample | weak body, bland, low cereal and low caramel | Good flavor balance |
| | Day 3 Control | | | no sediment in the overnight settled sample | weak body, bland, low cereal and low caramel | Good flavor balance |
| 1 | 1 | 130 | 2.9 | powder color darker than control | slightly intensified, no sourness | |
| 2 | 9 | 130 | 4.3 | slight sediment on the bottom of sample bucket | increased intensity vs. control; not sour vs. control | sl. lighter color and v. sl. weak on coffee flavor |
| 3 | 6 | 130 | 4.8 | no sediment on the bottom of the sample bucket | increased intensity vs. control; similar intensity but sour vs. least intense conditions (intensity level 1) run #1 | whiter than control; sl. weak coffee flavor to control |
| 4 | 7 | 145 | 5.0 | powder color lighter than control v. sl. sediment on the bottom of the sample bucket | increased intensity vs. control; similar to run #6 | similar color to control; v. similar coffee flavor and total sweet/flavor to control |
| 5 | 10 | 145 | 5.2 | slight sediment on the bottom of the sample bucket | increased intensity but not sour vs. control | v. sl. darker color and similar coffee impact but missing full body impact vs. control |
| 6 | 13 | 150 | 5.0 | powder color is lighter than control | Stronger flavor and sl. more sour vs. control | equiv. color and coffee flavor to control |

TABLE 2-continued

| Ranking of Intensity of Process conditions (1 = lowest 15 = most severe) | Run # | Reaction Temp. (C.) | Residence Time at Reaction Temp. (minutes) | General Observations | Taste Observations (black - all at 1% solids) | Taste Observations (SFV - all variants at 20% reduction in coffee) |
|---|---|---|---|---|---|---|
| 7 | 14 | 155 | 5.4 | powder color is lighter than control | Stronger flavor and sl. more sour than control | v. sl. darker color and v. sl. increased coffee impact vs. control |
| 8 | 2 | 160 | 3.0 | powder color darker than control small amount of sediment on overnight settled sample | more intense flavor | v. sl. lighter color; v. sl. sweeter and less coffee body vs. control |
| 9 | 11 | 160 | 5.2 | no sediment on the bottom of the bucket | darker cup color and intensified flavor vs. control | darker color vs. control; coffee impact is similar to control but not as sweet; coffee flavor is not as full bodied |
| 10 | 8 | 160 | 5.5 | small amount of sediment on the bottom of the sample bucket | Increased intensity vs. control; similar sour to control; | darker color than control; darker flavor and sl. increased coffee flavor to control |
| 11 | 15 | 170 | 0.25 | moderate level of sediment in the sample bucket powder color is similar to control | some undissolved particles which sediment out; stronger flavor and less sour than control | darker color and more coffee impact vs. control; coffee impact is not as full bodied; presence of sediment at the bottom of the cup was observed |
| 12 | 4 | 180 | 1.5 | moderate level of sediment on the bottom of the sample bucket | some undissolved particles which sediment out; stronger than control; no/slight sour; full bodied flavor | darker color and more coffee impact vs. control; coffee impact is not as full bodied; presence of sediment at the bottom of the cup was observed |
| 13 | 12 | 180 | 1.9 | unacceptable level of sediment in sample bucket powder color is lighter color vs. control | sl. darker cup color and intensified flavor vs. control; there are large amounts of undissolved particles which sediment out | much darker vs. control; coffee impact is same as control but not as sweet; coffee flavor is not as full bodied; presence of sediment at the bottom of the cup was observed |
| 14 | 5 | 180 | 2.4 | unacceptable level of sediment in sample bucket | some undissolved particles which sediment out; stronger than control; no/slight sour; full bodied flavor | v. sl. darker color than control; sl. more coffee impact than control; presence of sediment at the bottom of the cup was observed |

TABLE 2-continued

| Ranking of Intensity of Process conditions (1 = lowest 15 = most severe) | Run # | Reaction Temp. (C.) | Residence Time at Reaction Temp. (minutes) | General Observations | Taste Observations (black - all at 1% solids) | Taste Observations (SFV - all variants at 20% reduction in coffee) |
|---|---|---|---|---|---|---|
| 15 | 3 | 180 | 3.3 | unacceptable level of sediment in sample bucket | Intensified but no full bodied; sour; some undissolved particles which sediment out | v. sl. darker color than control; sl. more coffee impact than control; presence of sediment at the bottom of the cup was observed |

As can be seen by the results, if temperatures reach 180° C., the extract pH is lowered significantly resulting in undesirable sourness.

EXAMPLE 2

This example demonstrates the ability to intensify coffee flavor and color of 25% solids coffee extract at 120° C. It also demonstrates the utilization of treated coffee extract without spray-drying. Use of liquid treated coffee extract is applicable to ready-to-drink coffee beverages.

Spray-dried instant coffee powder was reconstituted to 25% solids concentration with 65° C. tap water. The instant coffee powder which was used was derived from a typical roasted coffee extraction process. The resulting coffee extract was recirculated in an Armfield FT74 ultra high temperature heat exchanger. The extract was heated in the tubular heat exchanger to a target reaction temperature of 120° C. The extract was held at the reaction temperature for a total of approximately 32 minutes. The processed coffee extract was allowed to cool to 22° C. and held in a sealed glass jar.

Organoleptic evaluation of the processed instant coffee extract was done after reconstituting a sample with 1500 ml of 180° F. water in a beaker. It was found that a 0.71% solids solution of the processed extract achieved a beverage of similar coffee strength compared to a 0.85% solids solution of untreated coffee extract.

The 0.71% solution of the processed coffee extract and the 0.85% solution of the unprocessed extract were evaluated on a blind basis by six members of an external panel trained in quantitative descriptive analysis. The results demonstrate that the 0.71% solution of processed coffee extract had a similar flavor profile as the 0.85% solids solution of untreated coffee extract. This represents a 20.5% increase in flavor intensity for the processed sample.

What is claimed is:

1. A method of intensifying the flavor and color of coffee extract comprising:

selecting a temperature and time for optimizing flavor and color of a soluble coffee extract;

heating said soluble coffee extract at said temperature and said time without increasing coffee solids content of said extract to intensify the flavor and color of the coffee extract without producing sedimentation; and cooling the heated coffee extract.

2. The method of claim 1 wherein the coffee extract contains 5 to 70% coffee solids.

3. The method of claim 2 wherein the extract contains 30 to 60% coffee solids.

4. The method of claim 1 wherein the temperature is from 110° C. to 170° C. and the time is from about 15 seconds to about 30 minutes.

5. The method of claim 4 wherein the temperature is from 130° C. to 160° C. and the time is from 2 to 6 minutes.

6. The method of claim 5 wherein the time is from 3 to 5 minutes.

7. The method according to claim 1 wherein said heating is effected while passing said coffee extract through a plug flow reactor.

8. The method of claim 1 additionally comprising drying the cooled, flavor intensified coffee extract.

9. The method of claim 8 wherein the drying is spray-drying.

10. A method according to claim 1 wherein the flavor of the coffee extract is intensified by at least 5%.

11. A method according to claim 10 wherein the flavor of the coffee extract is intensified at least 10%.

12. A method according to claim 10 wherein the flavor of the coffee extract is intensified at least 15%.

* * * * *